United States Patent [19]

Dudley

[11] 3,827,793
[45] Aug. 6, 1974

[54] STEREOSCOPIC MICROSCOPY
[75] Inventor: Leslie Peter Dudley, Los Angeles, Calif.
[73] Assignee: Dudley Optical Laboratories, Inc., Beverly Hills, Calif.
[22] Filed: Nov. 3, 1972
[21] Appl. No.: 303,493

[52] U.S. Cl............................. 353/8, 350/132, 353/7, 354/112, 353/39
[51] Int. Cl............................................ G03b 21/00
[58] Field of Search .............. 95/18 R; 353/7, 8, 10; 350/35, 132

[56] References Cited
UNITED STATES PATENTS
2,338,298  1/1944  Overhage............................ 350/132
3,191,493  6/1965  Mainardi et al. ........................ 353/8
3,663,085  5/1972  Davis.................................. 350/132

*Primary Examiner*—Richard M. Sheer
*Attorney, Agent, or Firm*—Jessup & Beecher

[57] ABSTRACT

An improved system is provided for converting both monocular and binocular non-stereoscopic microscopes to the stereoscopic mode with the aid of polarizing filters or color filters. The system includes means by which the specimen under examination can be viewed by stereo projection, and means by which stereo photomicrography on black-and-white or color film can be easily and effectively accomplished. The system also includes improved means for illuminating opaque specimens for stereo projection or stereo photomicrography by reflected light.

6 Claims, 9 Drawing Figures

PATENTED AUG 6 1974 3,827,793

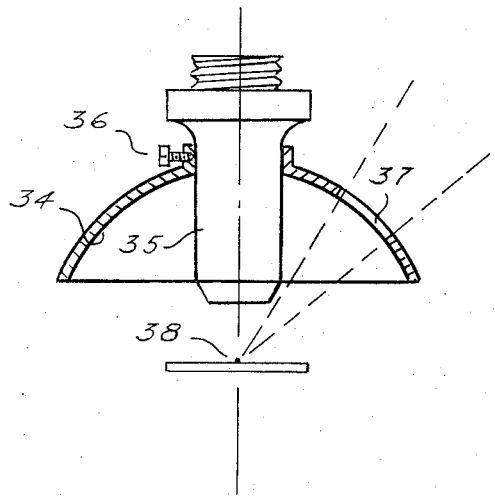
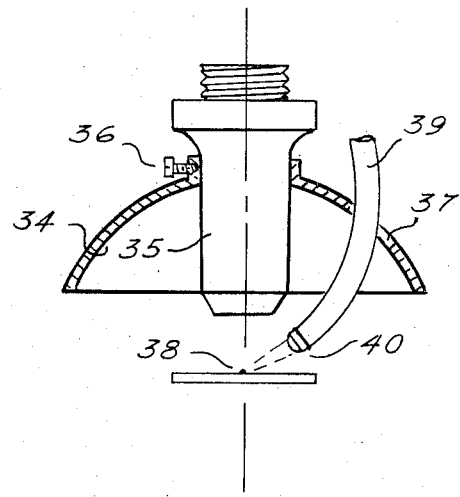
Fig. 5    Fig. 6
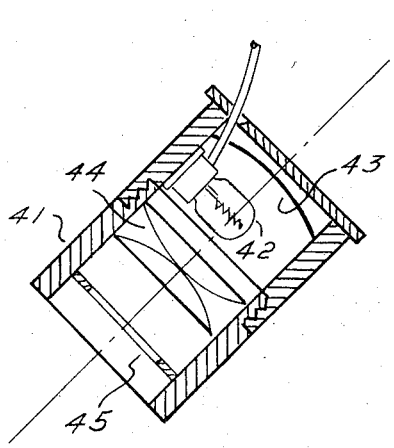
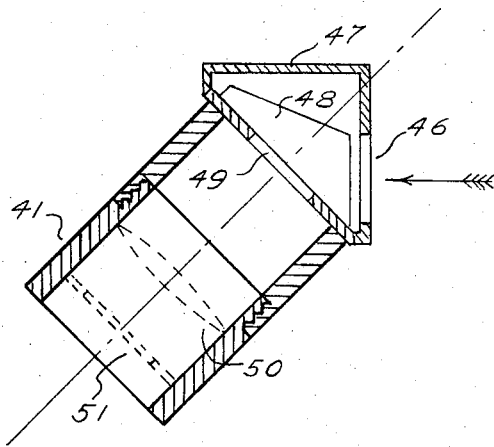
Fig. 7    Fig. 8
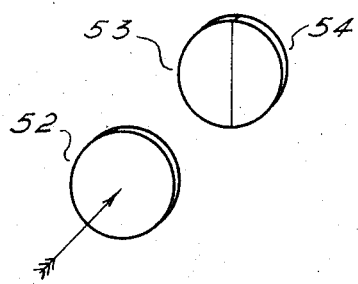
Fig. 9

STEREOSCOPIC MICROSCOPY

BACKGROUND OF THE INVENTION

The earliest, and best known, form of stereo microscope is that usually attributed to Greenough who, it appears, produced the first instrument of this type during the latter part of the nineteenth century. This type of instrument comprises, essentially, two monocular microscopes mounted side-by-side on a common support. The eyepieces are separated by the interocular distance of about 2.5 inches, and the microscope tubes are so mounted that the optical axes converge in the direction of the specimen under examination. Microscopes of this type cannot be designed for use with objectives having a power in excess of about 4X. Consequently, even with 20X eyepieces, the total magnification is limited to about 80X. This limit is imposed by the fact that the two objectives cannot be mounted sufficiently close together when higher magnifications are involved. Thus, with 4X objectives, the distance between the centers of the two front elements can be as great as about 0.7 inch, thereby rendering the design and mounting of the objectives a relatively simple matter. On the other hand, with 10X objectives, the distance between centers would need to be only about 0.25 inch, thereby presenting an insuperable design problem.

Another type of stereo microscope is the mono-objective type. With this type of microscope, which has been produced in various modified forms for a number of years, the parallax necessary for the formation of two disparate views of the specimen is provided by a single objective. One half of the field of the objective is utilized for production of the left-eye view, the other half being utilized for production of the right-eye view. The image-forming rays in the two halves of the field are linearly polarized about orthogonal axes by means of polarizing filters inserted in the optical system. In some types of instruments a beam-splitting polarizer is inserted in the exit pupil of the objective; in the other types, such as that described in Schulman's U.S. Pat. No. 2,255,631, the beam-splitting polarizer is placed below the diaphragm of the substage condenser. Upon emerging from the objective, the rays enter a prismatic beam-splitting system by which they are directed to binocular eyepieces. The left-eye and right-eye images are appropriately segregated by means of polarizing filters, corresponding with those in the beam-splitting polarizer, located just below or just above the eyepieces.

This type of microscope, unlike the Greenough type, is suitable for use at both high and low magnifications. However, binocular microscopes suffer from the disadvantage that they are considerably most costly than monocular microscopes. Moreover, in the most convenient form of the mono-objective stereo microscope, i.e., that due to Schulman, the instrument cannot be used for the stereoscopic examination of opaque specimens. This is due to the fact that, since the beam-splitting polarizer is located below the substage condenser, transmitted light must be used. A further disadvantage of existing forms of mono-objective stereo microscopes becomes evident when it is necessary to view a specimen under types of illumination with which the polarizing filters would create undesirable interference. Under these conditions, therefore, the polarizing filters must be removed, thereby converting the microscope to the non-stereoscopic mode.

The purpose of the present invention is to overcome the disadvantages mentioned above by providing: (1) simple systems for converting a monocular microscope from the non-stereoscopic or planoscopic mode to the stereoscopic mode; (2) simple systems for converting a binocular non-stereoscopic microscope to the stereoscopic mode; (3) improved illuminating means to facilitate stereoscopic examination of specimens by reflected light, and (4) suitable color filters for use instead of polarizing filters in those cases in which the use of polarizing filters is undesirable. Other features of the invention will become evident later in the specification.

BRIEF DESCRIPTION OF THE INVENTION

In all embodiments of the invention, a single microscope objective is used to provide two disparate views of the specimen. This is accomplished by inserting in the exit pupil of the objective a pair of polarizing filters so oriented that the image-forming rays in one half of the field are linearly polarized about an axis which is at right-angles to the axis of polarization of the image-forming rays in the other half of the field. Alternatively, the filters may be of a type which causes the two sets of rays to be circularly polarized in mutually opposite directions. As a further alternative, non-polarizing complementary color filters may be used. In this case, one of the two filters should transmit the additive primary, red, the other transmitting the subtractive primary, cyan. The reason for this choice is discussed in detail in applicant's co-pending U.S. Patent application Ser. No. 259,375, filed June 5, 1972. The filters may be of either the absorption or dichroic type.

The filters discussed above are supported in a circular mount adapted for easy insertion in, and removal from, the rear of the objective. Means are provided to enable the filters to be rotated about the optical axis of the microscope in order to ensure their correct orientation.

Adaption of Monocular Microscope

1. For Stereo Projection

This method involves the following steps: (a) Inserting in the exit pupil of the microscope objective a pair of filters of one of the types hereinbefore defined for the purpose of producing left-eye and right-eye images of the specimen, (b) providing a light source of adequate intensity to illumine the specimen by transmitted or reflected light so that the images can be projected on a screen, and (c) providing the observer with a binocular viewing device, such as a pair of spectacles, the eyepieces of which embody polarizing or color filters corresponding with those in the objective, thereby enabling the observer to view the projected images stereoscopically.

It is generally preferable for the surface of the projection screen to be disposed in a vertical plane. Accordingly, axial rays from the microscope must be projected toward the screen in a substantially horizontal direction. It is undesirable to provide this condition by tilting the microscope, as the specimen under examination may consist of, or be immersed in, a liquid. Consequently, it is necessary for the microscope stage to remain horizontal. Deflection of the light rays through the requisite angle, — usually 45° or 90°, — is accomplished by means of a prism or mirror located in the optical path, external to the microscope.

2. For Stereo Photomicrography

Method (a). The left-eye and right-eye images are projected simultaneously on color film, with or without the employment of a camera. Segregation of the left-eye and right-eye images is accomplished by the use of complementary color filters in the objective. Corresponding color filters are embodied in the eyepieces of the spectacles used for viewing the processed photomicrograph.

Method (b). The left-eye and right-eye images are projected simultaneously on film of the type (such as that known as Vectograph film) on which a pair of oppositely polarized images can be recorded in superposition. Segregation of the left-eye and right-eye images is accomplished by the use of polarizing filters in the objective. Corresponding polarizing filters are embodied in the eyepieces of the spectacles used for viewing the processed photomicrograph.

Method (c). Two sequential exposures are made, one for the left-eye view and one for the right-eye view, using a separate piece or frame of film for each exposure. The film may be of either the black-and-white or color type. Complementary color filters are used in the objective. During each of the two exposures, a color filter corresponding with one of those in the objective is placed in the beam of light emanating from the microscope so that, during one exposure, only the left-eye view is transmitted to the film and, during the other exposure, only the right-eye view is transmitted. After processing, the photomicrographs represent the two components of a simple stereogram or stereo pair, and are therefore suitable for viewing in a stereoscope or by other suitable means.

Method (d). This method is similar to method (c) above, but the color filters in the objective and those placed in the beam of light emanating from the microscope are replaced by appropriately oriented polarizing filters.

Adaptation of Binocular Microscope

The systems for adapting a binocular non-stereoscopic microscope for either stereo projection or stereo photomicrography in accordance with this invention are similar to those employed for the adaptation of a monocular microscope. The imagery from only one of the two eyepieces is used, that from the other eyepiece being extinguished or otherwise occulted from the projection screen or photosensitive surface, thereby, in effect, converting the microscope into a monocular instrument. The desirability of this arrangement arises for the following reason: Regardless of the presence of polarizing filters or color filters in the objective, both the left-eye and right-eye images are transmitted to each of the two eyepieces. Now, whereas it is possible, by means of appropriate filters, to extinguish the left-eye view from one eyepiece and the right-eye view from the other, it is much more convenient to eliminate both of the views from one eyepiece. The need for any additional prism or mirror system to converge the left-eye and right-eye images is thereby avoided. Further, when the specimen under examination is opaque, an effective method of illuminating the specimen by relfected light is made possible by the latter, preferred arrangement. In this method of illumination, the unwanted eyepiece is removed, and a beam of light is projected into the tube previously occupied by that eyepiece. The result is that a substantial proportion of the projected light is transmitted via the prism system and objective to the specimen, thus providing the equivalent of so-called vertical illumination.

BRIEF DESCRIPTION OF THE DRAWINGS

FIGS. 5, 6, 7 and 8 show devices for illuminating opaque specimens for viewing by reflected light.

FIG. 9 illustrates a system for producing circularly polarized light.

DETAILED DESCRIPTION OF THE INVENTION

1. Stereo Projection a. Transmitted Light

Figure 1:
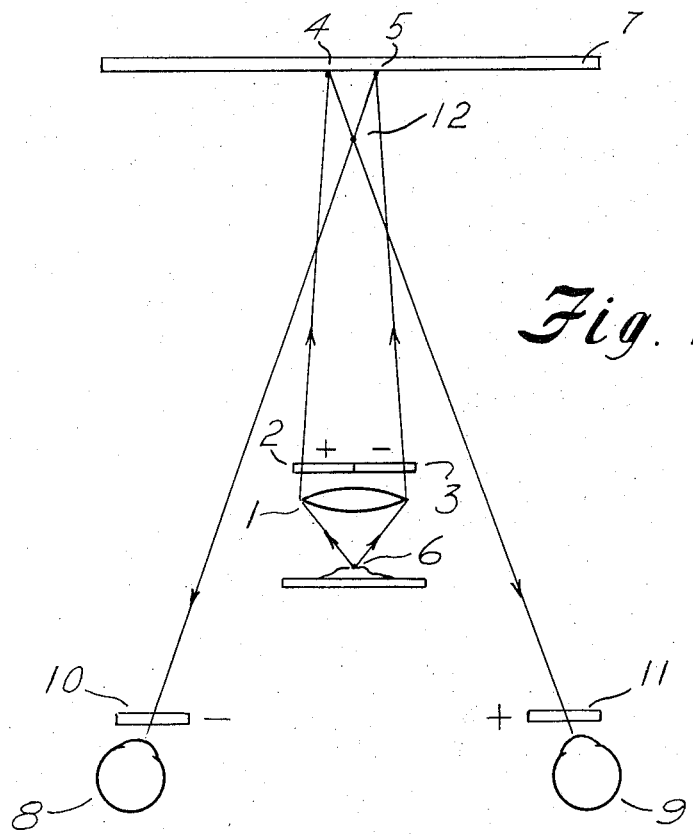
FIG. 1 is a schematic diagram showing a system for stereo projection microscopy using a single objective.

Referring, first, to FIG. 1, the diagram represents a microscope objective 1 at the exit pupil of which beam-splitting filters 2 and 3 are located. As illustrated, the filters segregate disparate images 4 and 5 of some point 6 in the specimen, the images being projected on the screen 7. It will be noted that the filters 2 and 3 are denoted by positive and negative symbols. This is to indicate that the pair are complementary in one or the other of three different ways. Thus, they may be plane polarizers oriented with their polarizing axes mutually at right-angles. Alternatively, they may be circular polarizers, one of the pair producing left-hand polarization, the other producing right-hand polarization. As a further alternative, the filters may be complementary color filters of either the absorption or dichroic type. When such color filters are used, one of the pair should have maximum transmittivity in the primary red region of the spectrum, and the other should have maximum transmittivity in the cyan region. For convenient insertion in the microscope objective, the filters are manufactured in the form of semicircular segments and then butted together as represented by details 2 and 3 in FIG. 2.

Reverting to FIG. 1, the left and right eyes 8 and 9 of an observer are represented as viewing the screen 7 through filters 10 and 11 corresponding with the filters in the exit pupil of the objective. Filter 10 transmits only the light emerging from the objective through filter 3, and filter 11 transmits only the light emerging from the objective through filter 2. Hence, the observer's left eye 8 sees the point image 5, and his right eye sees the point image 4. As a result, therefore, binocular fusion causes the observer to see a single point image in stereoscopic relief at 12, the point of intersection of his two lines of sight.

It will be evident that this method of stereo microscopy possesses substantial advantages over that provided by either the Greenough type of stereo microscope or by direct viewing with the mono-objective, binocular type of stereo microscope. Some of the limitations of these two types of instruments have already been discussed, but the method of the present invention possesses further advantages which should be noted. In the first place, simultaneous viewing by a group of observers is made possible. In the second place, the method herein disclosed is more efficient, insofar as illumination is concerned, than a microscope incorporating a prismatic beam-splitter together with polarizers. This is because, with the latter arrangement, only one-half of the total light transmitted by the first pair of polarizers and the prismatic beam splitter reaches each of the two eye-pieces. Thus, due to the action of the prism system, both the left-eye and right-eye views are transmitted to each eyepiece, and it is the purpose of the second pair of polarizers to occult the right-eye view from the observer's left eye and the left-eye view from his right eye. In other words, four images are produced, but only two are useful. The method of the present invention obviates the production of redundant images.

As illustrated in FIG. 1, the specimen is viewed by front projection. If segregation of the left-eye and right-eye images is accomplished by polarization, then the front surface of the screen 7 must, of course, be of material which does not cause appreciable depolarization of the incident light. A suitable screen can comprise, for example, a sheet of satin-finished aluminum or a sheet of some material the surface of which has been coated with aluminum paint. For rear projection, a screen of finely etched or ground glass is very suitable for use in conjunction with either polarizing filters or color filters.

It will be noted that no eyepiece is included in the arrangement shown in FIG. 1. This is because the inclusion of an eyepiece is not indigenous to the basic principle of the system, thereby illustrating a further difference between direct viewing stereo microscopy and the projection method of the present invention. In the case of direct viewing, eyepieces are essential to enable the observer's eyes, at the exit pupils of the eyepieces, to see the two virtual images formed by the objective(s). In the case of the projection method, on the other hand, the objective is used to form a pair of real images which are materialized on a screen. However, the use of an eyepiece with this method is generally desirable, as this makes possible the projection of images of better quality and higher magnification.

Figure 2:
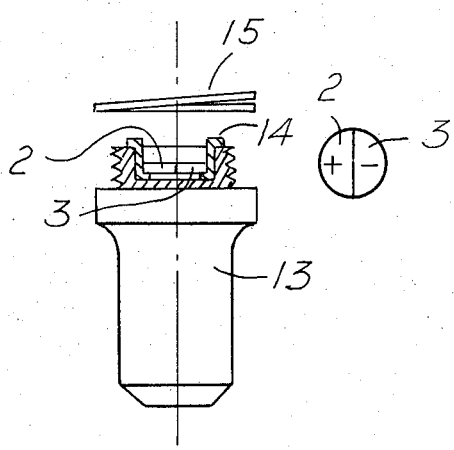
FIG. 2 shows an objective embodying a beam-splitting filter for use in stereo projection microscopy.

FIG. 2 shows a view, partly in section, of an objective 13 into which complementary filters 2 and 3 have been inserted, the filters being supported in a circular mount or collar 14. Prior to screwing the objective into the microscope, a spring washer 15 is slipped over the threaded portion. This enables the objective, and consequently the filters, to be readily rotated about the optical axis to achieve correct orientation of the filters without the objective becoming loose in the microscope tube or turret.

Figure 4:
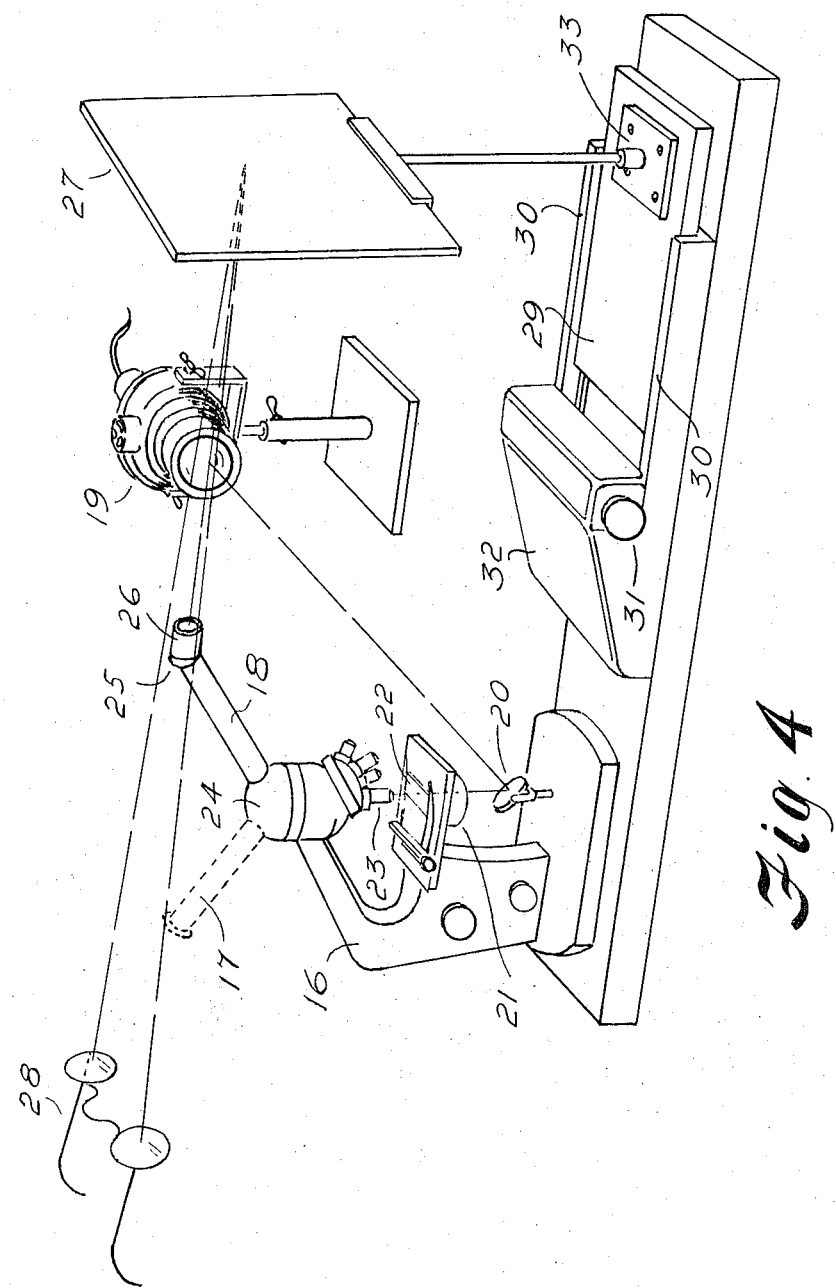
FIG. 4 is a perspective view of a monocular microscope and ancillary equipment for use in stereo projection.

Referring, now, to FIG. 4, the drawing is a perspective view of a monocular microscope and ancillary equipment suitable for stereo projection. The microscope 16 represented is of the type having a body of the so-called L-type of construction. The tube indicated by broken lines in the usual position 17 has been rotated, for projection purposes, through 180° to the position indicated in full lines at 18.

A beam of light from the high-intensity source 19 is projected onto the mirror 20 by which it is transmitted upward via the substage condenser 21 to the specimen on the slide 22. Light from the specimen reaches the objective 23, the exit pupil of which is provided with beam-splitting filters as explained in connection with FIG. 2. Hence, two disparate, complementary images of the specimen are transmitted via the prism within the housing or head 24 to the eyepiece 25. Light from the eyepiece emerges at an angle of substantially 45° to the horizontal; accordingly a prism, such as that represented in FIG. 3, located in the housing 26 adjacent the eyepiece, is used to deviate the beam downward through an angle of 45° so that the images are projected on the screen 27. The observer is provided with a pair of spectacles 28 the eyepieces of which embody complementary filters corresponding with those in the objective.

The screen 27 is mounted, with the aid of suitable supporting members, on a platform 29. It is preferable, but not essential, for the said platform to be supported in guides 30 so that it can be moved backward or forward with respect to the microscope for the purpose of adjusting the magnification and brightness of the projected images. A conveniently placed control knob 31 for effecting such movement is shown at the side of the housing 32 containing the driving mechanism. The method of propelling the platform in its guides may be by any one of various known means, such as rack-and-pinion mechanism, chain and pinion mechanism, friction drive mechanism, etc. Details of such mechanism are not included in the drawing as they do not, of themselves, constitute a part of the invention.

Figure 3:
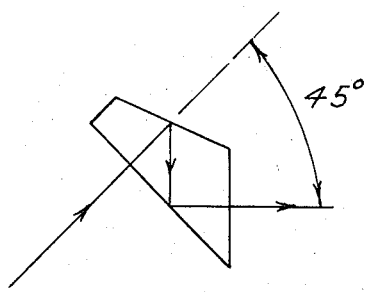
FIG. 3 shows a type of prism suitable for deviating a beam of light through an angle of 45°.

If the microscope body is of a type which enables the eyepiece tube to be adjusted to the vertical position, a prism such as that represented in FIG. 3 is no longer suitable for producing the requisite deviation of the projected light beam. Instead, deviation of the beam through the appropriate angle, —in this case 90°, — is effected by the use of a plane mirror or a right-angle prism oriented with its reflecting surface at an angle of 45° to the optical axis of the eyepiece.

b. Reflected Light

FIG. 5 is a view, partly in section, of a suitable arrangment for illuminating the specimen for viewing by reflected light. A concave reflector 34 is secured to the barrel of the objective 35 by means of the set-screw 36. A hole 37 is provided in the reflector so that light from an external high-intensity source can be focused, as represented by the converging broken lines, to a small spot on the specimen 38. As a result of the presence of the reflector, much of the light which would otherwise be lost by scattering outside the field of the objective is reflected back onto the specimen, thus increasing the brightness of the projected imagery. If desired, two or more holes such as that indicated at 37 can be provided in the reflector so that a plurality of light sources can be used.

The arrangement represented in FIG. 6 is the same as that shown in FIG. 5 except for the method of directing light onto the specimen. In the arrangement of FIG. 6, light from the external source is conducted through the aperture 37 by means of an optical pipe 39. The optical pipe may comprise either a single transparent rod of glass or plastic material or, alternatively, a fiber optics bundle. The end cap 40 of the optical pipe is provided with a condensing lens by which the light is focused to a small spot on the specimen.

FIG. 7 is a view, partly in section, of an alternative illuminator which can be used when the microscope is of the mono-objective binocular type. The diameter of the cylindrical housing 41 is the same as that of an eyepiece so that, after removal of one of the eyepieces from the microscope, the illuminator illustrated can be inserted in its place. By means of a light source 42, a concave mirror 43 and a condensing lens system 44, a collimated beam of light is projected down the microscope tube via the aperture or stop 45. A substantial proportion of this light reaches the specimen via the optical system of the microscope, providing the equivalent of so-called vertical illumination and thus enabling the imagery to be projected through the remaining eyepiece. It is preferable for the cylindrical housing of the illuminator to comprise two threaded portions as shown, so that, when it is necessary to gain access to the lamp or other internal components, this is facilitated by unscrewing the two parts.

FIG. 8 represents a device similar to that shown in FIG. 7, but adapted for use with an external source of illumination. Light is projected, in the direction indicated by the arrow, through the aperture 46 in the housing 47. A prism 48, of similar type to that shown in FIG. 3, is located within the housing, by which means the light is deviated through an angle of 45° so that it travels axially through the cylindrical housing 41 via the aperture 49. The need, or lack thereof, for a lens or lenses at 50 and (or) an additional aperture or stop at 51 is dependent upon the degree of collimation and diameter of the beam of light entering the aperture 46.

2. Stereo Photomicrography

The basic equipment illustrated in FIG. 4, minus the screen 27 and the spectacles 28, is readily adaptable to each of the methods of stereo photomicrography constituting features of the invention.

The screen 27 and the support are removed by, for example, detaching and removing the plate 33. Then a camera or, alternatively, just a film (or plate) holder equipped with a shutter and provided with suitable supporting means, is mounted on the platform 29 so that the center of the format coincides with the center of the emergent beam of light from the microscope. This apparatus is not illustrated, as various suitable types of such equipment are known. The photographic equipment can be conveniently adjusted, by means of the control knob 31, to the correct distance from the microscope. Control of the illumination for the purpose of making a photographic exposure can be effected by any one of three methods: by switching on and off the light at the source 19; by uncapping and capping the exit window of the prism housing 26, or by actuation of the shutter in the camera or film (or plate) holder.

Whereas the illuminating system represented in FIG. 4 is for the stereo viewing and photomicrography of specimens by transmitted light, it will be understood that the invention is also adaptable to both the stereo viewing and photomicrography of specimens by reflected light. For the latter purpose, when a monocular microscope is used, suitable illuminating means are those described in connection with FIGS. 5 and 6. When the microscope is of the binocular type, the methods of FIGS. 5 and 6 may still be used, provided that the unrequired eyepiece is left permanently capped. However, with this type of microscope, the use of one or the other of the means described in connection with FIGS. 7 and 8 is preferred.

The four different types of stereo photomicrographs which can be produced in accordance with the invention have been previously described in that section of the BRIEF DESCRIPTION OF THE INVENTION devoted to stereo photomicrography.

3. Circular Polarization

For the purpose of the present invention, a convenient method of producing circularly polarized light is made possible by the fact that such light can be obtained by the conversion of plane polarized light. Thus, circularly polarized light can be obtained by creating an appropriate, permanent phase difference between two beams of light, of equal amplitude, which are plane polarized about orthogonal axes.

When a ray of plane polarized light passes perpendicularly into an anisotropic crystal plate, the ray is divided into two parts — the ordinary ray, which obeys Snell's law, and the extraordinary ray, which does not. The ordinary ray passes through the plate undeviated, while the extraordinary ray undergoes deviation and emerges parallel to, but displaced from, the ordinary ray. If the plate is very thin, the deviation is negligible. Due to the existence of two reflective indices, there is a difference in optical thickness between the paths of the two rays through the plate, this resulting in a phase difference. This is true except for two, and sometimes only one, orientation(s) of the plane of polarization of the incident ray relative to the crystal. These directions in the crystal are referred to as privileged directions or optic axes. If the plane of polarization of the incident ray is parallel to a privileged direction, the emerging ray remains plane polarized. So-called biaxial crystals have two privileged directions, these directions always being mutually perpendicular. Uniaxial crystals, as the name implies, have only one privileged direction.

When plane polarized light is incident on an anisotropic crystal plate, the resulting phase difference $\phi$ resulting from its passage through a thickness t is given by:

$$100 = 2\pi t (\mu_2 - \mu_1)/\lambda$$

in which $\mu_2$ and $\mu_1$ are the two refractive indices and $\lambda$ is the wavelength of the incident light. We are concerned here with the case where the phase difference is $\pi/2$, that is to say, with a quarter-wave plate. In the case of a quarter-wave plate, the emergent beam is, in general, elliptically polarized, the axes of the ellipse being parallel to the optic axes. If the plane of polarization of the incident light is at an angle $\phi$ to the optic axes, then the ratio of the two axes of the ellipse amount to tan $\phi$. It follows, therefore, that when $\phi$ is equal to $\pi/4$, the emergent light is circularly polarized, as in this case the two axes of the ellipse are equal.

As a result of the above considerations, a variety of different methods of utilizing circularly polarized light instead of plane polarized light in conjunction with the present invention become practicable. Referring to FIG. 9, in explanation of one such method, consider a ray of light emerging from the microscope objective in the direction indicated by the arrow and incident on a plane polarizer 52. After passing through the plane polarizer, the light is incident on a beam-splitting quarter-wave plate. The quarter-wave plate comprises two semicircular segments 53 and 54, the optic axes of the segments being at an angle $\pi/4$ to the plane of polarization of the light transmitted by the polarizer 52. Consequently, the light emerging from the quarter-wave plate is circularly polarized. In order that the left-eye and right-eye images of the specimen may be segregated, it is necessary that the light emerging from the two halves of the quarter-wave plate be circularly polarized in mutually opposite directions. This can be accomplished by fabricating the quarter-wave plate from two pieces of quartz, one of so-called left-hand quartz, the other of right-hand quartz, butted together as shown in FIG. 9. The terms "left-hand" and "right-hand" are used to denote the direction of rotation of the resultant polarized light vector. Generally, the light is said to be right-hand circularly polarized if the direction of rotation is clockwise with respect to an observer looking toward the source, and left-hand circularly polarized if the direction is counter-clockwise. Sometimes, however, the opposite convention is adopted.

Although reference is made here to the use of a beam-splitting quarter-wave plate composed of two pieces of quartz, such phase retardation devices are more commonly made of stretched plastic films impregnated with microscopic crystals. For clarity, the plane polarizer and the beam-splitting quarter-wave plate are shown separated in FIG. 9, but in practice they are placed in surfact contact and supported in the microscope objective in a circular mount or collar of the type indicated in FIG. 2 by detail 14.

For viewing the projected images, the observer uses spectacles the eyepieces of which embody plane polarizers with their polarizing axes parallel and corresponding with the axis of the plane polarizer in the objective. A right-hand quarter-wave phase retarder is mounted in contact with one of the eyepiece plane polarizers, a left-hand quarter-wave phase retarder being mounted in contact with the other eyepiece plane polarizer. If the images of the specimen are viewed by front projection, and if the left-eye and right-eye views are respectively left-hand and right-hand circularly polarized (according to the convention indicated above), then the left-eye phase retarder must produce right-hand circular polarization, and the right-eye phase retarder must produce left-hand circular polarization. This is because, in the case of front projection, the observer looks in the direction of light propagation instead of toward the source.

Of the numerous other methods of employing circularly polarized light in conjunction with the invention, the most simple is that in which the beam-splitting polarizer in the objective is the same as that previously described for use with plane polarized light. Conversion to circularly polarized light is accomplished simply by providing the eyepieces of the viewing spectacles with quarter-wave phase retarders.

It will have been noted from the equation given previously for the evaluation of $\phi$ that the phase difference is wavelength dependent, which is disadvantageous. Accordingly, for best results, monochromatic light should be used. However, when polychromatic or white light is used, satisfactory results can be obtained provided that the design of the phase retarders is based on a value of $\lambda$ near the middle of the visible spectral range, say about 5,500 angstroms. An advantage to be gained by the use of circularly polarized light is that a slight sideways tilt of the observer's head does not cause perception of a double image as occurs when plane polarized light is used.

The invention having been fully described, it is understood that it is not to be limited to the details herein set forth, but is of the full scope of the appended claims.

What is claimed is:

1. A stereo microscopic projection system comprising the following elements: A monocular microscope having an objective lens with an exit pupil, which is provided with beam-splitting complementary filters at the exit pupil for the purpose of producing a pair of disparate images of the specimen under examination; a light source for illuminating the specimen; a screen on which the projected images are materialized, and a pair of spectacles for use in viewing the said projected images, the eyepieces of the spectacles embodying complementary filters corresponding with those in the objective in a manner such that only one of the two disparate images on the screen is visible to the observer's left eye, while only the other image is visible to his right eye.

2. A stereo microscopic projection system according to claim 1 in which the filters at the exit pupil of the objective as well as those in the eyepieces of the viewing spectacles are of the complementary color type, one of the beam-splitting filters and one of the eyepiece filters having maximum transmittivity in the primary red region of the spectrum, while the other beam-splitting filter and eyepiece filter have maximum transmittivity in the primary cyan region.

3. A stereo microscopic projection system according to claim 2 in which the complementary color filters are of the absorption type.

4. A stereo microscopic projection system according to claim 2 in which the complementary color filters are of the dichroic type.

5. A stereo microscopic projection system according to claim 1 in which the beam-splitting filters at the exit pupil of the objective are of the plane polarizing type, one of the filters transmitting light which is polarized about an axis which is perpendicular to the axis of polarization of the light transmitted by the other filter, and in which the eyepiece of the viewing spectacles embody corresponding plane polarizing filters.

6. A stereo microscopic projection system according to claim 5 in which a left-hand quarter-wave plate is mounted in surface contact with the plane polarizer in one of the eyepieces of the viewing spectacles, a right-hand quarter-wave plate being mounted in surface contact with the plane polarizer in the other eyepiece, so that the light transmitted to the observer's left eye is circularly polarized in a direction opposite to that of the circularly polarized light transmitted to his right eye.

* * * * *

UNITED STATES PATENT OFFICE
CERTIFICATE OF CORRECTION

Patent No. 3,827,793     Dated August 6, 1974

Inventor(s) Leslie Peter Dudley

It is certified that error appears in the above-identified patent and that said Letters Patent are hereby corrected as shown below:

Column 8, line 42, the left-hand term in the mathematical equation should read -- $\phi$ --, not 100.

Signed and sealed this 22nd day of October 1974.

(SEAL)
Attest:

McCOY M. GIBSON JR.
Attesting Officer

C. MARSHALL DANN
Commissioner of Patents